(12) United States Patent
Cherna et al.

(10) Patent No.: US 8,553,976 B2
(45) Date of Patent: Oct. 8, 2013

(54) DIFFERENTIAL IMAGE ENHANCEMENT

(75) Inventors: Timothy David Cherna, San Francisco, CA (US); Ralph Thomas Brunner, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/544,728

(22) Filed: Jul. 9, 2012

(65) Prior Publication Data
US 2012/0274650 A1 Nov. 1, 2012

Related U.S. Application Data

(62) Division of application No. 12/182,028, filed on Jul. 29, 2008, now Pat. No. 8,229,211.

(51) Int. Cl.
G06K 9/00 (2006.01)
G09G 5/00 (2006.01)
H04N 1/00 (2006.01)

(52) U.S. Cl.
USPC .............. 382/162; 345/581; 358/1.9

(58) Field of Classification Search
USPC ......... 382/162, 282, 283, 305, 312; 345/419, 345/581, 582, 589; 358/1.9, 517, 518, 537, 358/538
See application file for complete search history.

(56) References Cited

U.S. PATENT DOCUMENTS

| | | | |
|---|---|---|---|
| 5,432,896 A * | 7/1995 | Hwong et al. | 345/592 |
| 6,144,384 A | 11/2000 | Nakazawa | |
| 6,275,302 B1 | 8/2001 | Coleman | |
| 6,369,830 B1 | 4/2002 | Brunner et al. | |
| 6,373,490 B1 * | 4/2002 | Bendiksen et al. | 345/441 |
| 6,870,550 B1 * | 3/2005 | Schuster et al. | 345/639 |
| 7,054,482 B2 | 5/2006 | Mao | |
| 7,106,275 B2 | 9/2006 | Brunner et al. | |
| 7,158,158 B1 | 1/2007 | Fleming et al. | |
| 7,289,127 B1 | 10/2007 | Zimmer et al. | |
| 7,302,648 B1 | 11/2007 | Brunner et al. | |
| 7,312,800 B1 | 12/2007 | Gies et al. | |
| 7,313,764 B1 | 12/2007 | Brunner et al. | |
| 7,330,192 B2 | 2/2008 | Brunner et al. | |
| 7,397,964 B2 | 7/2008 | Brunner et al. | |
| 7,583,276 B1 * | 9/2009 | Worthington | 345/647 |
| 7,593,020 B2 | 9/2009 | Zitnick, III | |
| 7,602,405 B2 | 10/2009 | Hsu | |
| 7,768,525 B2 | 8/2010 | Hsu | |
| 7,826,668 B1 | 11/2010 | Zaklika et al. | |
| 8,037,413 B2 * | 10/2011 | Johnston | 715/716 |
| 2005/0231502 A1 | 10/2005 | Harper et al. | |

(Continued)

OTHER PUBLICATIONS http://www.photoshopuser.com/lightroom2/ last visited on Jul. 29, 2008.

(Continued)

Primary Examiner — Kanjibhai Patel
(74) Attorney, Agent, or Firm — Wong, Cabello, Lutsch, Rutherford & Brucculeri LLP

(57) ABSTRACT

Techniques for differentially enhancing selected areas within a digital image are disclosed. In certain embodiments, one or more attributes of a selected pixel or a group of pixels is determined. Examples of such attributes include color properties, grayscale properties, and/or multi-pixel properties, such as texture. In certain embodiments, the attribute may be used in conjunction with the properties of a modification tool, such as a brush, to selectively modify pixels having the attribute value or a similar attribute value.

19 Claims, 13 Drawing Sheets

(56) References Cited

U.S. PATENT DOCUMENTS

| | | |
|---|---|---|
| 2005/0231514 A1 | 10/2005 | Harper et al. |
| 2005/0285866 A1 | 12/2005 | Brunner et al. |
| 2005/0289519 A1 | 12/2005 | Sazegari et al. |
| 2007/0076020 A1 | 4/2007 | Fleming et al. |
| 2007/0085854 A1 | 4/2007 | Zimmer et al. |
| 2007/0182747 A1 | 8/2007 | Harper et al. |
| 2007/0182749 A1 | 8/2007 | Brunner et al. |
| 2007/0201833 A1 | 8/2007 | Cherna et al. |
| 2007/0257925 A1 | 11/2007 | Brunner et al. |
| 2008/0012870 A1 | 1/2008 | Gies et al. |
| 2008/0030425 A1 | 2/2008 | Fullerton et al. |
| 2008/0030504 A1 | 2/2008 | Brunner et al. |
| 2008/0030621 A1 | 2/2008 | Ciudad et al. |
| 2008/0034292 A1 | 2/2008 | Brunner et al. |
| 2008/0072173 A1 | 3/2008 | Brunner et al. |
| 2008/0134079 A1 | 6/2008 | Brunner et al. |

OTHER PUBLICATIONS http://www.scottkelby.com/blog/2008/archives/1739#more-1739 last visited on Jul. 29, 2008.

http://www.photoshoperuser.com/lightroom2/features/ last visited on Jul. 29, 2008.

http://www.adobe.com/products/photoshoplightroom/features last visited on Jul. 29, 2008.

http://blogs.adobe.com/lightroomjournal/ last visited on Jul. 29, 2008.

* cited by examiner

DIFFERENTIAL IMAGE ENHANCEMENT

CROSS-REFERENCE TO RELATED APPLICATIONS

This application is a divisional of U.S. patent application Ser. No. 12/182,028, entitled "Differential Image Enhancement", filed Jul. 29, 2008, which is herein incorporated by reference in its entirety for all purposes.

BACKGROUND

1. Technical Field

The present invention relates generally to modifying an image for display using differential weighting.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Digital imaging and digital image processing techniques are increasingly common. For example, the commercial availability of digital cameras as well as the wide-spread dissemination of digital images over the Internet and by e-mail make digital images, such as photographs, a common feature of daily life. As a consequence of the presence of these digital images, it is also increasingly common for individuals to wish to enhance or modify such images to improve the appearance of an image or a part of an image.

For example, a viewer may wish to brighten a digital image or to increase the contrast of a digital image. Typically such image modifications affect the image uniformly, thereby modifying portions of the image that may need enhancement, but also modifying portions that do not need the enhancement. Further, to the extent that such modifications may be applied to only a portion of the image, the same problem may arise with regard to the modified portion. That is, some areas within the portion may be enhanced even though these areas do not need to be enhanced. For example, when wishing to brighten the face of an individual in a digital photograph, the areas surrounding the face may also be brightened due to the area effect of the tools, such as brushes, used to apply the enhancement. To address this difficulty, it may be necessary to use a finer tool or brush with a reduced area effect. However this approach is usually labor intensive, requiring a user to painstakingly modify only those portions of the image where the enhancement is desired without inadvertently straying into areas of the image where enhancement is not desired. Thus, it may not be possible to easily enhance selected portions of an image without also enhancing portions that do not need enhancement.

SUMMARY

Certain aspects of embodiments disclosed herein by way of example are summarized below. It should be understood that these aspects are presented merely to provide the reader with a brief summary of certain forms an invention disclosed and/or claimed herein might take and that these aspects are not intended to limit the scope of any invention disclosed and/or claimed herein. Indeed, any invention disclosed and/or claimed herein may encompass a variety of aspects that may not be set forth below.

The present disclosure generally relates to techniques for differentially enhancing selected areas within a digital image. In certain embodiments, a user selects an attribute value, such as color, grayscale intensity, or texture, corresponding to the pixels to which an enhancement is to be applied. This attribute value may be used in conjunction with the properties of a modification tool, such as a brush, to selectively modify pixels having the attribute value or a similar attribute value.

For example, in one embodiment, a weighting value may be generated for each pixel within a region of image. Each weighting values may be generated based on the difference between the respective pixel and a selected attribute value (such as the difference between the color of the pixel and a specified color value) and based on a probabilistic distribution associated with the modification tool (such as a brush that applies an effect based on a Gaussian distribution). Thus, in this example, each weighting value may be a function of the color difference between the respective pixel and the selected value and of the location of the pixel within the areas of effect of the brush. The respective weighting values may then be used to apply an enhancement, such as an increase or decrease in brightness, to the pixels within the region of the image being enhanced. In this way, the enhancement may be differentially applied based not only on the properties of the brush, but also on the properties of the pixels being enhanced relative to some selected value. Further, in such an embodiment, the enhancement may be differentially applied without an edge detection step (such as an algorithm employing gradient threshold comparisons) being performed.

BRIEF DESCRIPTION OF THE DRAWINGS

These and other features, aspects, and advantages of the present invention will become better understood when the following detailed description of certain exemplary embodiments is read with reference to the accompanying drawings in which like characters represent like parts throughout the drawings, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The application is generally directed to techniques, systems, and/or applications used in the modification of images. In particular, in accordance with the present disclosure, all or part of an image may be modified using a tool that allows visually similar regions of an image to be differentially enhanced or processed relative to dissimilar regions. In certain embodiments, the differential processing or enhancement may take into account such factors as proximity to a point where the tool is centered as well as the degree of difference between a visual characteristic of one or more pixels relative to a selected value for the visual characteristic. In one embodiment, the techniques described herein allow for processing or enhancement of an image that respects edges or distinct regions within an image without applying an algorithm that detects those edges, i.e., without edge detection. With this in mind, an example of a suitable device for use in accordance with the present disclosure is as follows.

Figure 1:
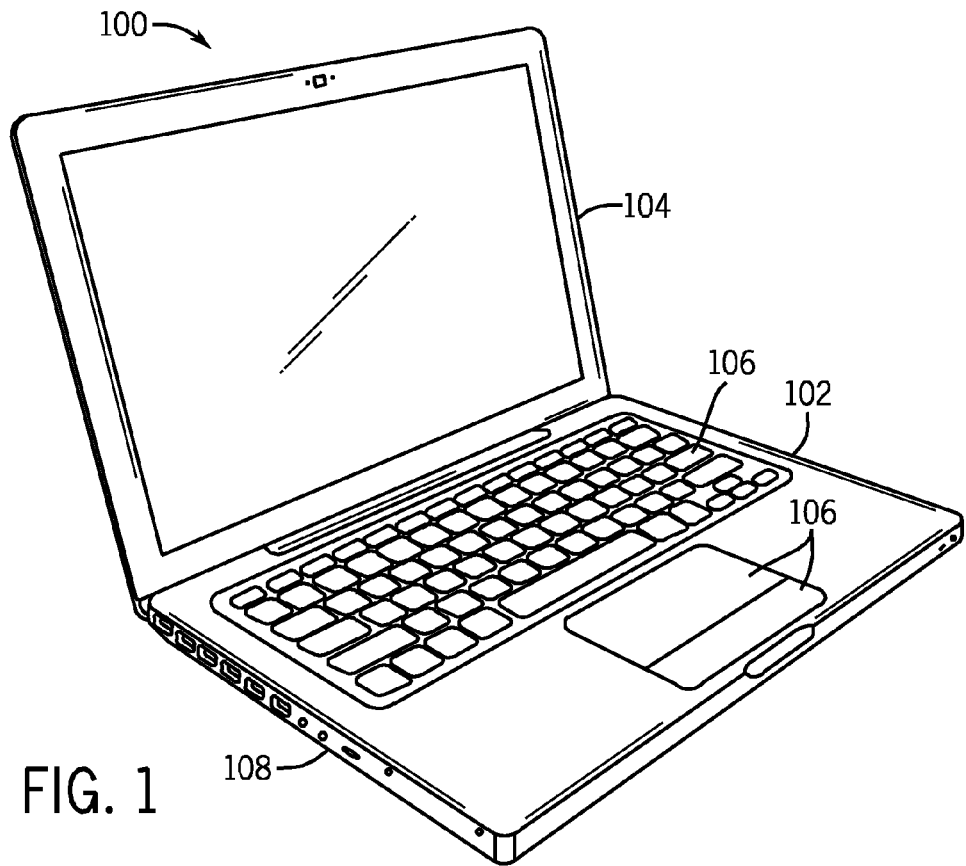
FIG. 1 is a perspective view illustrating an electronic device in accordance with one embodiment of the present invention.

An exemplary electronic device 100 is illustrated in FIG. 1 in accordance with one embodiment of the present invention. In some embodiments, including the presently illustrated embodiment, the device 100 may be processor-based system, such as a laptop or desktop computer, suitable for modifying or manipulating digital images. Other processor-based systems may include servers, thin-client workstations, portable or handheld devices capable of displaying and/or manipulating images or video, or the like. By way of example, the electronic device 100 may be a model of a MacBook, MacBook Pro, MacBook Air, iMac, Mac mini, or Mac Pro available from Apple Inc.

In the presently illustrated embodiment, the exemplary electronic device 100 includes an enclosure or housing 102, a display 104, input structures 106, and input/output connectors 108. The enclosure 102 may be formed from plastic, metal, composite materials, or other suitable materials, or any combination thereof. The enclosure 102 may protect the interior components of the electronic device 100 from physical damage, and may also shield the interior components from electromagnetic interference (EMI).

The display 104 may be a liquid crystal display (LCD). The LCD may be a light emitting diode (LED) based display or some other suitable display, such as a cathode ray tube (CRT) or organic light emitting diode (OLED). In one embodiment, one or more of the input structures 106 are configured to control the device 100 or applications running on the device 100. Embodiments of the portable electronic device 100 may include any number of input structures 106, including buttons, switches, a mouse, a control or touch pad, a keyboard, or any other suitable input structures. The input structures 106 may operate to control functions of the electronic device 100 and/or any interfaces or devices connected to or used by the electronic device 100. For example, the input structures 106 may allow a user to navigate a displayed user interface or application interface.

The exemplary device 100 may also include various input and output ports 108 to allow connection of additional devices. For example, the device 100 may include any number of input and/or output ports 108, such as headphone and headset jacks, universal serial bus (USB) ports, IEEE-1394 ports, Ethernet and modem ports, and AC and/or DC power connectors. Further, the electronic device 100 may use the input and output ports 108 to connect to and send or receive data with any other device, such as a modem, networked computers, printers, or the like. For example, in one embodiment, the electronic device 100 may connect to a scanner, digital camera or other device capable of generating digital images (such as an iPhone or other camera-equipped cellular telephone) via a USB connection to send and receive data files, such as image files.

Figure 2:
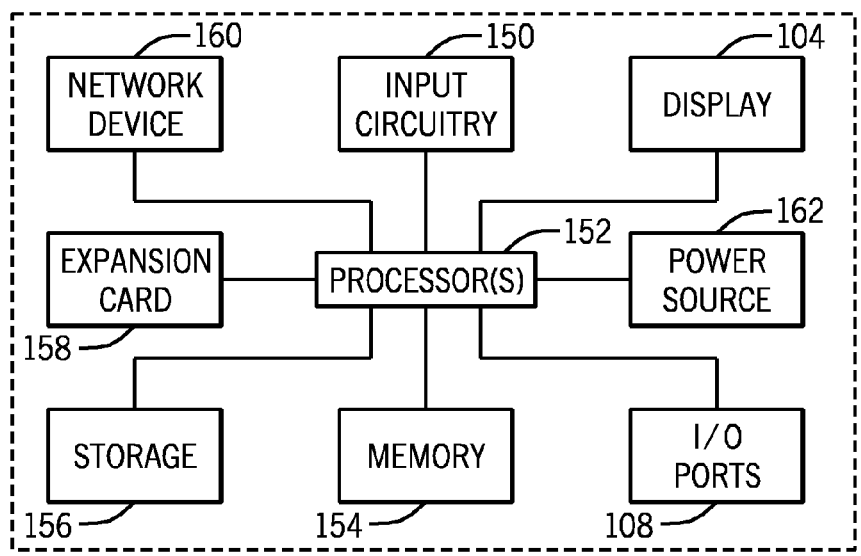
FIG. 2 is a simplified block diagram illustrating components of an electronic device in accordance with one embodiment of the present invention.

The electronic device 100 includes various internal components which contribute to the function of the device 100. FIG. 2 is a block diagram illustrating the components that may be present in the electronic device 100 and which may allow the device 100 to function in accordance with the techniques discussed herein. Those of ordinary skill in the art will appreciate that the various functional blocks shown in FIG. 2 may comprise hardware elements (including circuitry), software elements (including computer code stored on a computer-readable storage structure) or a combination of both hardware and software elements. It should further be noted that FIG. 2 is merely one example of a particular implementation and is merely intended to illustrate the types of components that may be present in a device 100 that allow the device 100 to function in accordance with the present techniques.

In the presently illustrated embodiment, the components may include the display 104 and the I/O ports 108 discussed above. In addition, as discussed in greater detail below, the components may include input circuitry 150, one or more processors 152, a memory device 154, a non-volatile storage 156, expansion card(s) 158, a networking device 160, and a power source 162.

The input circuitry 150 may include circuitry and/or electrical pathways by which user interactions with one or more input structures 106 are conveyed to the processor(s) 152. For example, user interaction with the input structures 106, such as to interact with a user or application interface displayed on the display 104, may generate electrical signals indicative of the user input. These input signals may be routed via the input circuitry 150, such as an input hub or bus, to the processor(s) 152 for further processing.

The processor(s) 152 may provide the processing capability to execute the operating system, programs, user and application interfaces, and any other functions of the electronic device 100. The processor(s) 152 may include one or more microprocessors, such as one or more "general-purpose" microprocessors, one or more special-purpose microprocessors and/or ASICS, or some combination thereof. For example, the processor 152 may include one or more instruction processors, as well as graphics processors, video processors, and/or related chip sets.

As noted above, the components may also include a memory 154. The memory 154 may include a volatile memory, such as random access memory (RAM), and/or a non-volatile memory, such as read-only memory (ROM). The memory 154 may store a variety of information and may be used for various purposes. For example, the memory 154 may store firmware for the electronic device 100 (such as a basic input/output instruction or operating system instructions), other programs that enable various functions of the electronic device 100, user interface functions, processor functions, and may be used for buffering or caching during operation of the electronic device 100.

The components may further include the non-volatile storage 156. The non-volatile storage 156 may include ROM, flash memory, a hard drive, or any other suitable optical, magnetic, or solid-state storage medium, or a combination thereof. The non-volatile storage 156 may be used to store data files such as media content (e.g., music, image and video files), software (e.g., for implementing functions on electronic device 100), wireless connection information (e.g., information that may enable the electronic device 100 to establish a wireless connection, such as a telephone or wireless network connection), and any other suitable data.

The embodiment illustrated in FIG. 2 may also include one or more card slots. The card slots may be configured to receive an expansion card 158 that may be used to add functionality to the electronic device 100, such as additional memory, I/O functionality, or networking capability. Such an expansion card 158 may connect to the device through any type of suitable connector, and may be accessed internally or external to the enclosure 102. For example, in one embodiment, the expansion card 158 may be flash memory card, such as a SecureDigital (SD) card, mini- or microSD, CompactFlash card, Multimedia card (MMC), or the like.

The components depicted in FIG. 2 also include a network device 160, such as a network controller or a network interface card (NIC). In one embodiment, the network device 160 may be a wireless NIC providing wireless connectivity over any 802.11 standard or any other suitable wireless networking standard. The network device 160 may allow the electronic device 100 to communicate over a network, such as a Local Area Network (LAN), Wide Area Network (WAN), or the Internet. Further, the electronic device 100 may connect to and send or receive data with any device on the network, such as portable electronic devices, personal computers, printers, and so forth. Alternatively, in some embodiments, the electronic device 100 may not include a network device 160. In such an embodiment, a NIC may be added into card slot 158 to provide similar networking capability as described above.

Further, the components may also include a power source 162. In one embodiment, the power source 162 may be one or more batteries, such as a lithium-ion polymer battery. The battery may be user-removable or may be secured within the housing 102, and may be rechargeable. Additionally, the power source 162 may include AC power, such as provided by an electrical outlet, and the electronic device 100 may be connected to the power source 162 via a power adapter. This power adapter may also be used to recharge one or more batteries if present.

Figure 3:
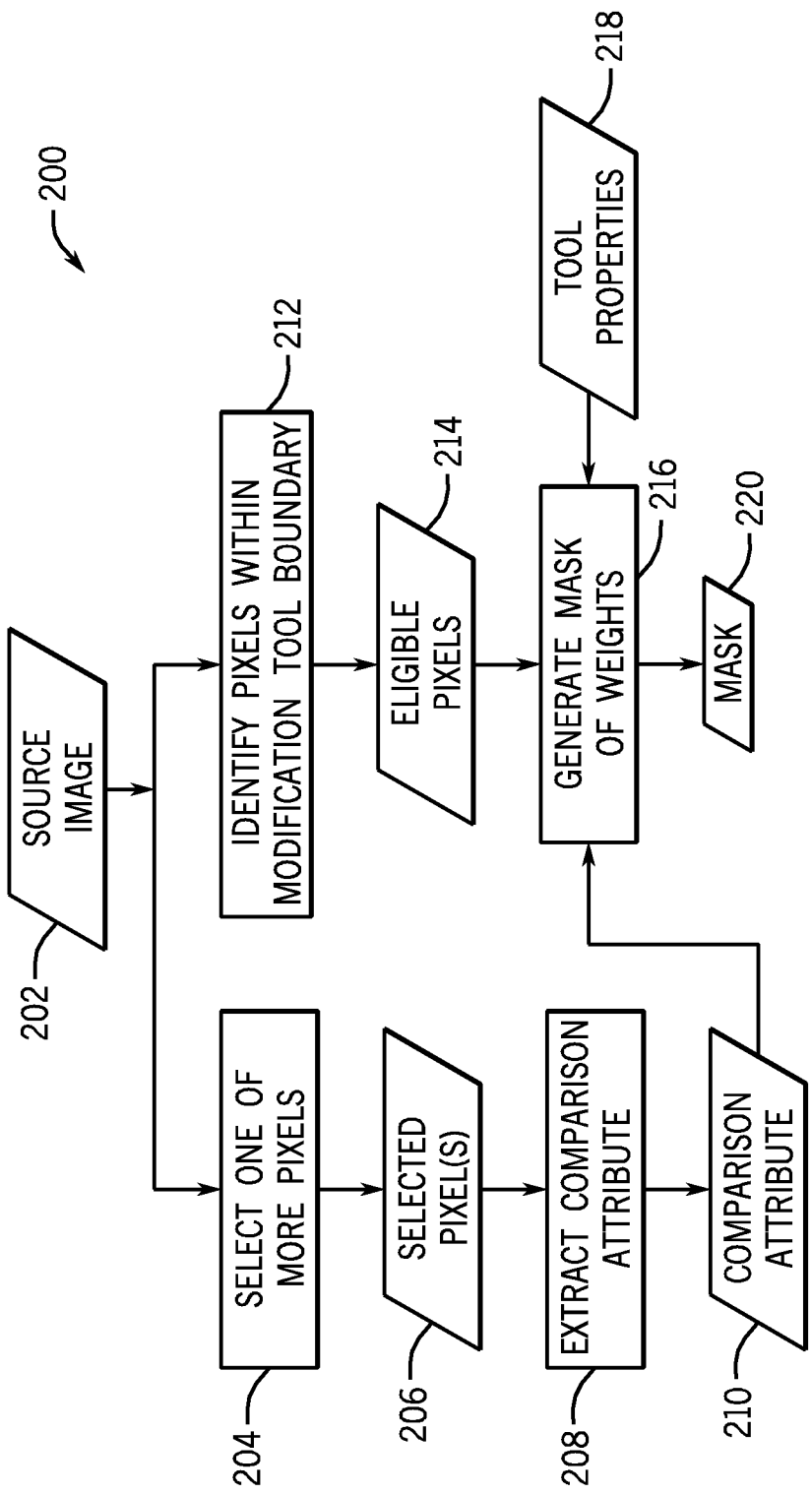
FIG. 3 is a flow chart depicting acts for generating a mask of weights in accordance with one embodiment of the present invention.

With the foregoing discussion in mind, various techniques and algorithms for implementing aspects of the present disclosure on such devices 100 and accompanying hardware, storage, and memory devices are discussed below. Turning to FIG. 3, a flowchart 200 depicting exemplary logic for modifying a source image 202 in accordance with the present disclosure is provided. As used herein, the act of modifying an image should be understood to encompass not only embodiments where of the pixels of the image itself are altered, but also embodiments where an underlying version of an image remains unaltered but other, altered versions of the image are generated. Likewise, the act of modifying an image should also be understood to encompass embodiments where the underlying image itself is unaltered, but mask or other overlay layers are generated which, when displayed in conjunction with the image alter the appearance of the image. That is, the act of modifying an image should be understood to encompass the various techniques by which a user may implement various image enhancements to generate an altered image for display, regardless of whether the original source image is actually altered or is instead maintained in its original form by the use of masks or by maintaining multiple versions of the image.

Returning now to FIG. 3, in the depicted embodiment, one or more pixels 206 exhibiting a visual characteristic of interest are selected (Block 204). For example, in the depicted implementation, one or more pixels having the desired visual characteristic may be selected from the source image 202 itself. In other implementations, the one or more pixels may be selected from a different image than the source image 202 or from a color or texture palette, such as may be displayed with or near the source image 202.

The pixel or pixels 206 may be selected using a selection tool, such as a cursor or other pointing tool. In one embodiment, the selection tool may be implemented as part of a brush used to apply an effect or enhancement to a bounded area or region of the source image 202. For example, a brush may be employed which, when held over the source image 202, includes a boundary or line, such as a circular, oval, or rectangular boundary, that circumscribes the area of effect for the brush. In this example, the selected pixels 206 may be those at or near the center of the bounded region or may be pixels within some other defined portion of the bounded region.

In one embodiment, the pixel(s) 206 are selected based on an attribute exhibited by the pixel(s) 206. For example, for a color image, the color properties of a displayed pixel may be described in different ways or in accordance with different color measurement systems. In such a color context, a pixel may be described by its color or by one or more components associated with the color. Examples of such color components include chrominance (which may also be described as hue or saturation in different color spaces) and/or intensity (which may also be described as luminance, depending on the color space). Similarly, in a grayscale context, a pixel may be described by its grayscale intensity.

Where more than one pixel 206 is selected at block 204, the individual selected pixels may share a color or grayscale attribute of interest, such as having the same or a similar color or grayscale intensity value. Alternatively, a selected group of pixels may posses an attribute that is not discernible at the individual pixel level but is discernible for the group of pixels. Examples of such aggregate or group pixel attributes may include a texture or a pattern. For example, an array of pixels (such as a 3×3, 4×4, 5×5, 3×4 array, or so forth) may be described as having a texture that conveys information about directionality, linearity, uniformity, and/or flow as observed in the aggregated pixels. Thus, an array of pixels representing materials such as hair, fabric, wood, and so forth, might depict an associated texture reflecting a grain or pattern observed in these materials. Therefore, a group of selected pixels 206 may be described not only by the attributes of the individual pixels, such as color or grayscale values, but also by attributes of the aggregated pixels, such as texture.

In the depicted embodiment, the attribute 210 for which the pixel(s) 206 are selected is identified (block 208) and this attribute may be used as a comparison criterion in subsequent operations. For example, in one embodiment, a single pixel 206 may be selected based on the color of the pixel 206. The color of the selected pixel 206 might then be identified for use later as a comparison attribute 210. Similarly, in another embodiment, an array of pixels 206 (such as a 3×3, 4×4, or 5×5 array) may be selected based on a texture observed in the selected array of pixels 206. The texture might then be identified for use later as a comparison attribute 210. In other embodiments, more than one comparison attribute 210 might be identified for multiple comparison operations. For example, for a group of selected pixels 206 both a color and a texture might be identified as comparison attributes 210.

In the depicted embodiment, pixels 214 of the source image 202 that are eligible for modification are identified (block 212). In one embodiment, the eligible pixels 214 may be identified based on their being located within a boundary associated with a modification tool displayed on the source image 202. In one such embodiment, the modification tool may be a brush that is displayed on, and is movable over, the source image 202. Such a brush may be represented by a boundary line (such as a circle, oval, square, or rectangle) displayed on the source image 202 such that the boundary circumscribes the pixels susceptible to modification by the brush, i.e., the area of effect.

In one embodiment, a brush used to identify the eligible pixels 214 is also used to select pixels 206 exhibiting the desired comparison attribute 210. For example, in this embodiment, the brush may be moved over the source image 202 until the center of the brush is over one or more pixels having the color, grayscale intensity, texture, or whatever other attribute is of interest for comparison. While the center of the brush may be used to determine this comparison attribute, the boundary or edge of the brush may determine the limit at which an effect may be applied, i.e., what pixels are eligible for modification. In one such example, the brush may be moved about the image 202 after the comparison attribute 210 has been determined so that different areas or regions of the image 202 may be modified by the brush based on the selected comparison attribute 210.

Based on the comparison attribute 210 and the properties of the modification tool selected, the eligible pixels 212 may be modified or a mask 220 generated (block 216) to generate a displayed image that is different from the source image 202. The pixel modification or mask generation step may take into account a variety of factors. For example, in the depicted embodiment, the mask 220 may be generated based upon a comparison of the eligible pixels 214 with the selected attribute 210 and upon the properties 218 of the modification tool. As discussed herein, the mask 220 may determine the extent to which the eligible pixels 214 are modified when displayed.

With regard to the tool properties 218, these properties may include the size and/or shape of the modification tool. For example, in an implementation where the modification tool is a brush, the tool properties 218 may include a brush size (such as a radius or diameter for round brushes) and/or brush shape (such as whether the brush is round, rectangular, square, oval, and so forth). In addition, in certain embodiments, the tool properties 218 may include a mathematical or statistical distribution function (such as a Gaussian, beta, or other probability distribution) associated with the effects of the brush. By way of example, in one implementation a brush may apply a modification to a bounded area of the source image 202 based in part on a Gaussian distribution such that pixels near the center of the brush are probabilistically more likely to be modified than pixels near the boundary of the brush in accordance with a Normal probability distribution. In some embodiments, this distribution may be modified or adjusted to allow for coarser or finer detail work, depending on the preference of the user.

With regard to the comparison attribute 210, in one embodiment those pixels 214 having a value for the attribute in question (such as color or texture) equal to the comparison attribute 210 are modified or receive a greater degree of modification, such as by being assigned a higher weight in the mask 220. For example, in one such embodiment, those eligible pixels 214 having a color value equal to the comparison attribute 210, i.e., the selected color, are eligible to be modified, pending other considerations, such as tool properties 218. Likewise, in such an embodiment, if the comparison attribute 210 were a texture exhibited by an array of the selected pixels 206, only those eligible pixels 214 which, when taken together, exhibited the texture would be eligible to be modified.

In other embodiments, the eligible pixels 214 need not identically exhibit the selected attribute 210 to be eligible for modification, i.e., to receive a weighting in the mask 220. In one such embodiment, eligible pixels 214 whose value of the selected attribute is similar to the value of the comparison attribute 210 may be eligible for modification. In such embodiments, one or more threshold differences or the mathematical differences themselves may be employed to determine the proportionate weighting of an eligible pixel 212. Further, in certain embodiments, the degree of difference used in determining a weighting value may depend on the size of the tool, such as a brush, used to apply the modification. For example, when a smaller brush is employed, such as for detail work, a different similarity threshold may be employed (or absolute mathematical differences may be emphasized or deemphasized to a different degree) than when a larger brush is employed.

For example, in one embodiment where a color value in the CIE L*a*b* color space is the comparison attribute 210, eligible pixels 214 having color values within some threshold range of the comparison attribute 210 may be treated as if they had the selected color value. In one embodiment a color difference may be determined based upon the magnitude of the vector between the respective color points within the color space, such as the L*a*b* color space, and this difference may be compared to a threshold value. Alternatively, the differences between the respective color values of the eligible pixels and the selected color value may be used to generate a proportionate weighting for each pixel. In one such implementation, the color difference may be represented by the magnitude of the vector between the respective color points within the L*a*b* color space. Similarly, in other color space models, such as the YCbCr, RGB, CMYK, CIELUV, CIELCH, and CIECAM02, other measures of color may be employed in determining respective pixel weightings.

In certain embodiments, the degree of similarity between the eligible pixels 212 and the comparison attribute 210 may be taken into account such that more similar pixels 214 are allotted proportionally greater weight in the mask 220. In one embodiment this may be accomplished by using multiple threshold values relative to the selected attribute 210. For example, in an embodiment where a color value in the CIE L*a*b* color space is the comparison attribute 210, eligible pixels 214 having color values within a narrow threshold distance relative to the comparison attribute value may be considered as having the selected color value, i.e., as being the same color. Eligible pixels 214 having color values outside the narrow threshold distance but inside a broader threshold may be accorded some lesser weighting and eligible pixels 214 having color values outside the broader threshold may be accorded little or no weight in the mask 220. In other embodiments, the degree of similarity of an eligible pixel 214 to the comparison attribute 210 may be directly proportional to the weight accorded the respective pixel.

The preceding discussion describes implementations in which a single comparison attribute 210 is considered in generating the mask 220. However, in some embodiments, a user may select more than one comparison attribute 210 for consideration in generating the mask 220. For example, a user might select two or more different color values as comparison attributes 210 and these different color values may, depending on the implementation, be given the same or different weighting in the mask 220. In one such embodiment, one color value might be considered the primary comparison attribute 210 while other color values might be considered secondary, tertiary, and so forth. In addition, in embodiments with more than one comparison attribute 210, the different comparison attributes 210 need not be to the same pixel characteristics. For example, in one implementation, a texture and a color value might both be selected as comparison attributes 210, such as to allow differential modification of pixels representing red hair, blonde hair, and so forth. In such embodiments, the different comparison attributes may be given the same or different weighting in the mask 220.

To facilitate explanation, the preceding discussion relates the effects of the tool properties 218 and the comparison attribute 210 on the mask 220 as if they were independent of one another. While these factors may indeed function independently in certain embodiments, in other embodiments, the effects of tool properties 218 and comparison attribute 210 may be combined, such as additively or multiplicatively, to generate the weights used in the mask 220. For example, in an embodiment where the modification tool is a round brush and the weights are applied in accordance with a Gaussian distribution, the weight at a given pixel of the mask 220 might be determined by $w=e^{-r^2}$, where w is the weighting value and r is the distance of the pixel in question from the center of the brush. In this simple embodiment, the attributes of the underlying pixels in the source image 202 are not considered and the weights are assigned based strictly on the brush location and the statistical distribution employed.

Conversely, in another embodiment, the similarity of the pixels in the source image 202 to a comparison attribute 210 may be considered in addition to the tool properties. In one such embodiment, the previous equation for a round brush employing a Gaussian distribution might be modified such that, for a given pixel of the mask 220, the weight might be given by $w=(e^{-r^2})(e^{-d^2})$ where d corresponds to a value for the difference between the corresponding pixel of source image 202 and the comparison attribute 210. For example, in an implementation where the comparison attribute 210 is a particular color value as measured in the L*a*b* color space, the value for d at a given pixel might be the difference between the color value at the pixel 214 and the color value selected as the comparison attribute 210. Thus, in this embodiment, the weighting values within the mask 220 are based not only on the tool properties 218 but also on the characteristics of the corresponding pixels of the source image 202.

In other embodiments, the value of d might be assigned in a more qualitative manner. For example, in an implementation where absolute identity is required between the eligible pixels 214 and the comparison attribute 210, d may be assigned a value of 0 where identity is present and some maximal value where a respective eligible pixel 214 does not possess the comparison attribute 210. Similarly, in embodiments where the comparison attribute 210 is a texture associated with a group of pixels, the value of d for an eligible pixel 214 might be based upon whether the respective pixel is determined to be a member of a group of pixels exhibiting the texture (i.e., d=0) or not (i.e., d=a maximal value). Therefore, as in the previously discussed embodiment, the weighting values within the mask 220 are based on the tool properties 218 as well as on the corresponding pixels of the source image 202.

As depicted in FIG. 3, in one embodiment a mask 220 may be generated as a function of tool properties 218 and comparisons between eligible pixels 214 of the source image 202 and some comparison attribute 210. The mask 220, in one embodiment, consists of cells corresponding to respective pixels of the source image 202. In one such embodiment, each cell of the mask contains a value ranging from 0 to 1, i.e., 0% to 100%, that determines the extent to which an effect or modification will be applied in a displayed image at the corresponding pixel. Thus, the mask 220 can function as a weighting table for the effect or modification being applied to the eligible pixels 214 within the modification tool area of effect, such as the area of effect of a brush.

Figure 4:
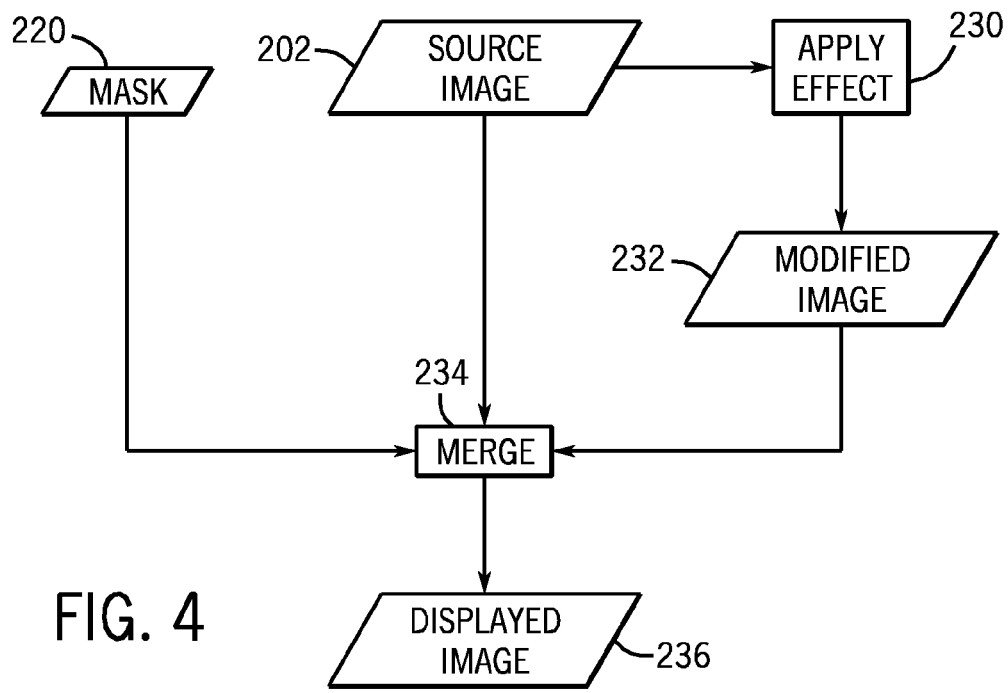
FIG. 4 is a flow chart depicting acts for generating a displayed image in accordance with one embodiment of the present invention.
Figure 5:
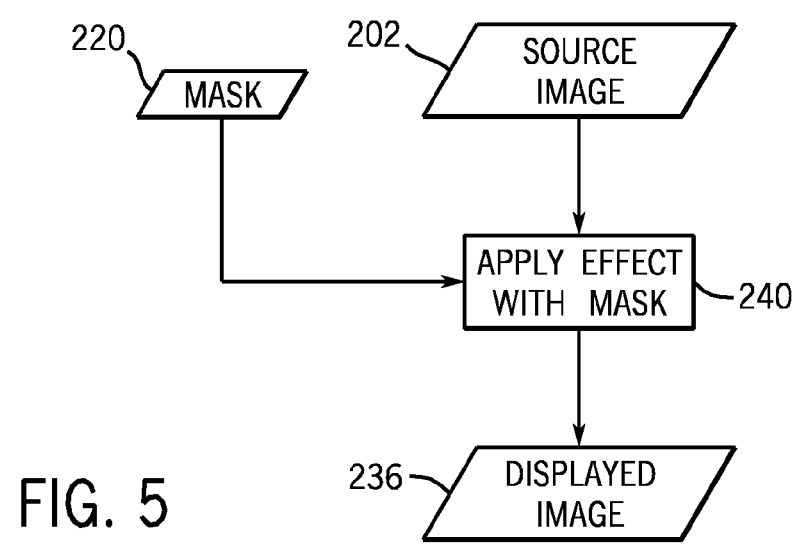
FIG. 5 is a flow chart depicting acts for generating a displayed image in accordance with another embodiment of the present invention.

Turning now to FIGS. 4 and 5, various techniques by which the mask 220 can be utilized in generating an image for display are illustrated. In the depicted implementation of FIG. 4, an effect is applied (block 230) to all or part of the source image 202 to generate a modified image 232. For example, the enhancement may, in one embodiment, be applied to only the eligible pixels 214 identified with respect to the location of a modification tool, such as a brush, on the source image 202. The applied effect may be one or more of various types of operations typically performed in image enhancement. Such operations may include increasing or decreasing brightness or other properties of the pixels being modified.

Returning now to FIG. 4, the modified image 232, the source image 202, and the mask 220 are merged (block 234) to generate the displayed image 236. For example, in one implementation, the pixels of the modified image 232 are weighted by the respective weights in the mask 220 and the weighted modified image is displayed as an overlay or layer over the source image 202. In such an implementation, the displayed image 236 might be the source image 202 with the weighted modified image provided as an overlying layer. In such an embodiment, the weights in the mask 220 might correspond to the degree of opacity (i.e., 1 equals complete opacity, 0 equals no opacity, and so forth) assigned to the respective pixels of the modified image 232 in forming the overlay layer.

In the implementation depicted in FIG. 5, no separate modified image 232 is generated. Instead, in this embodiment, the mask 220 and the source image 202 may be used to directly generate a layer for display in conjunction with the source image 202 to produce the displayed image 236. For example, the source image 202, the mask 220, and the effect being applied (block 240) may be used to generate a layer which, when combined with the source image 236, yields the displayed image 236. Such embodiments allow removal of the generated layer to return to the source image 202.

In another embodiment, the mask 220 may be used to apply the effect (block 240) directly to the source image 202 to generate the displayed image 236. In such embodiments, the pixel values of the source image 202 are modified or changed in accordance with the mask 220 and the effect to generate the displayed image 236. Indeed, turning once again to FIG. 3, in certain embodiments, no mask 220 may be generated. Instead, the values of the eligible pixels 214 in the source image 202 may be changed or modified based on the tool properties 218 and comparison attributes 210, as discussed above, to generate a displayed image instead of a mask 220. In such embodiments, the pixel values of the source image 202 are actually modified or a separate display image is generated by modifying a copy of the source image 202.

Figure 6:
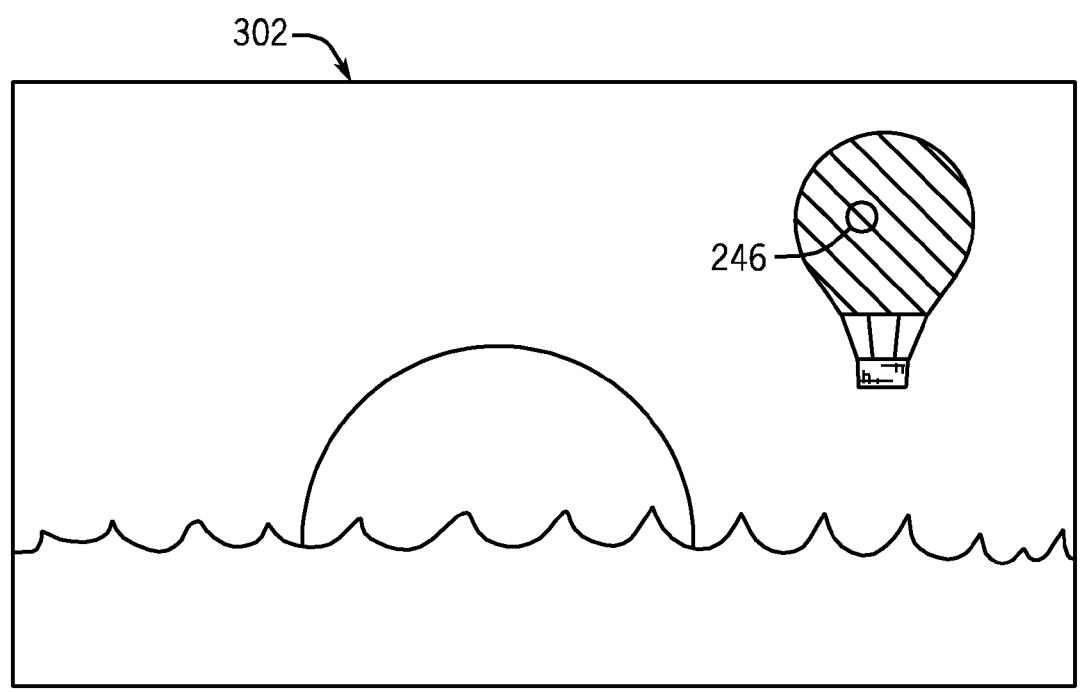
FIG. 6 depicts an exemplary digital image and the use of a modification tool to select a pixel having a desired attribute value in accordance with one embodiment of the present invention.

With the preceding discussion in mind, the following example is provided to further illustrate one implementation of the present technique. Referring to FIG. 6, in this example, a source image 202 is initially provided. In the depicted implementation, a modification tool 246 having a circular boundary is used to select a pixel having a desired value for a pixel attribute of interest. In the depicted example, the tool 246 is used to select a pixel within a balloon depicted in the image 202. In this manner, a pixel (or group of pixels) having a color, grayscale intensity, texture or other attribute representative of the balloon may be identified.

Figure 7:
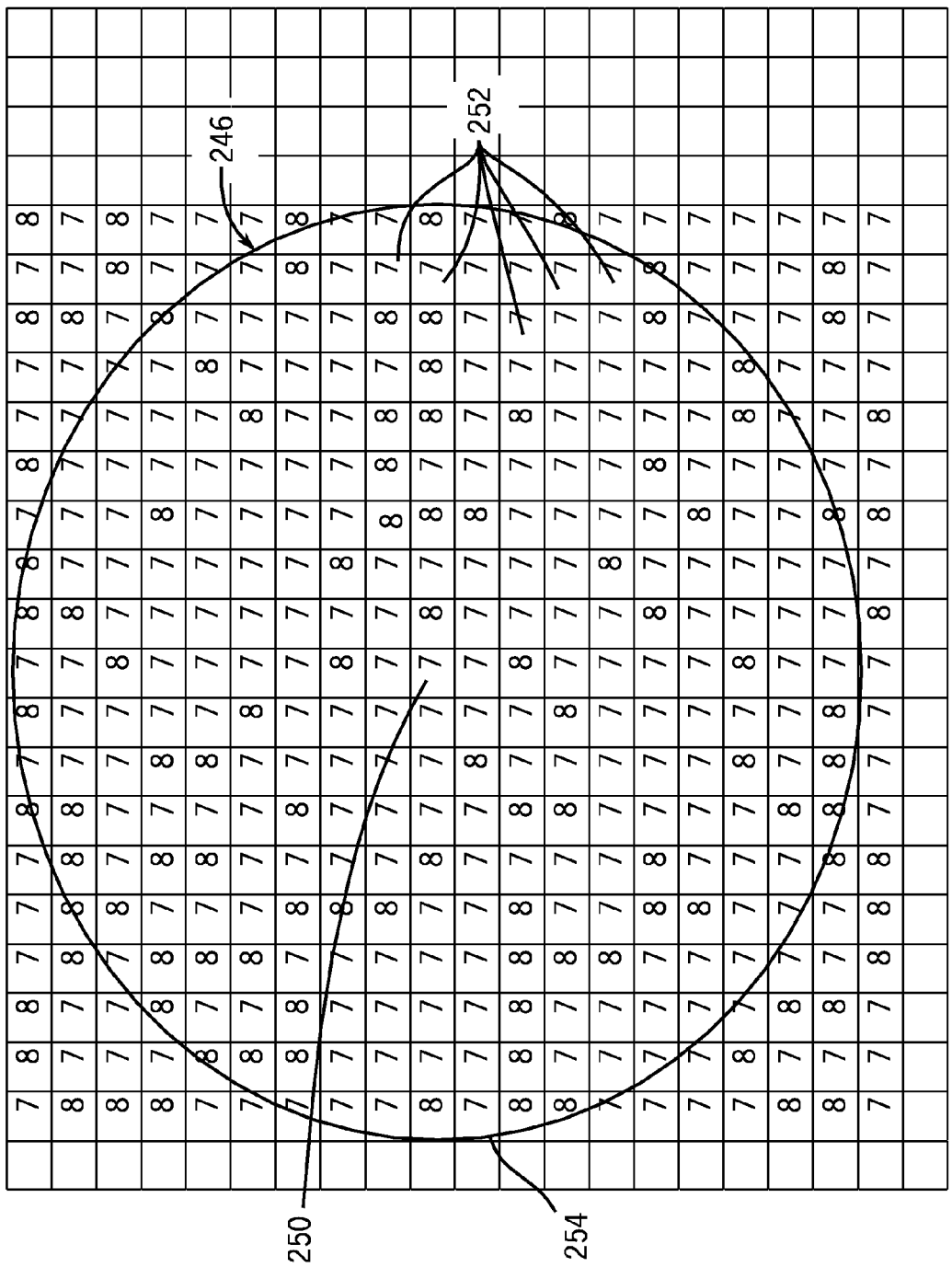
FIG. 7 depicts a close up of the modification tool of FIG. 6 in accordance with one embodiment of the present invention.

For example, referring to FIG. 7, pixels 252 of the source image 202 are depicted where each pixel has a numeric value associated with some attribute of interest, such as color or grayscale intensity. In the depicted example, the center pixel 250 within the boundary of the modification tool 246 is selected and the value for the attribute of interest at this center pixel (here the value "7") is identified. Thus, the user can center the modification tool 246 on one or more pixels exhibiting the desired value (such as a color value or a grayscale intensity) for the attribute of interest to identify that value for subsequent processes. In other implementations, instead of a single center pixel 250 a group or array of pixels may be identified at the center, or elsewhere within the boundary 254, to identify a value for an attribute, such as texture, that is exhibited by a group of pixels.

Figure 8:
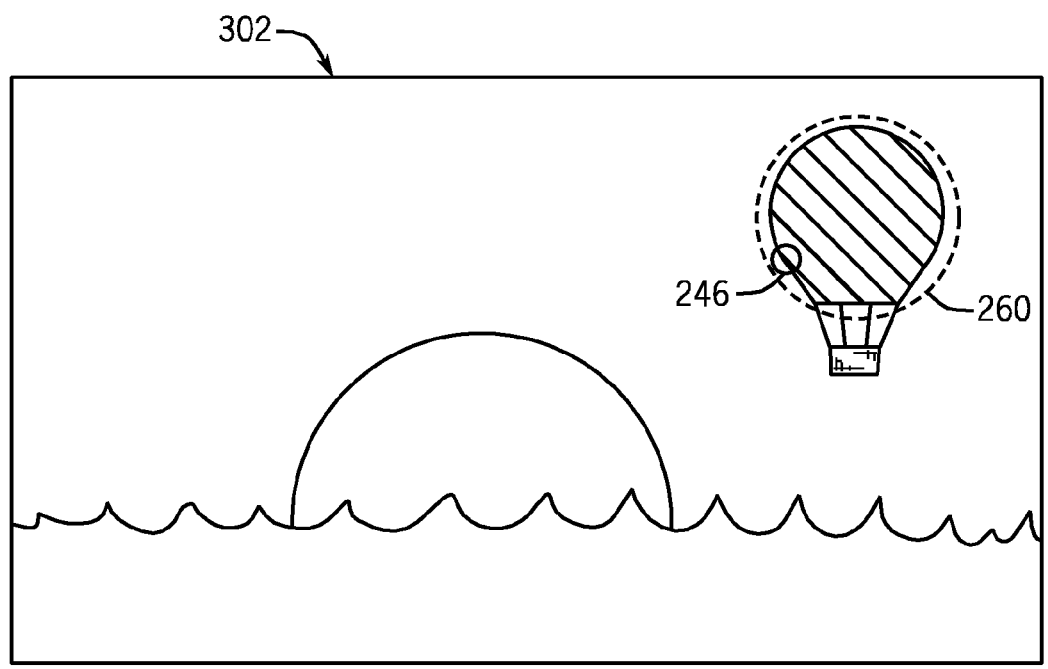
FIG. 8 depicts the modification tool of FIG. 6 selecting a region of the digital image for enhancement in accordance with one embodiment of the present invention.
Figure 9:
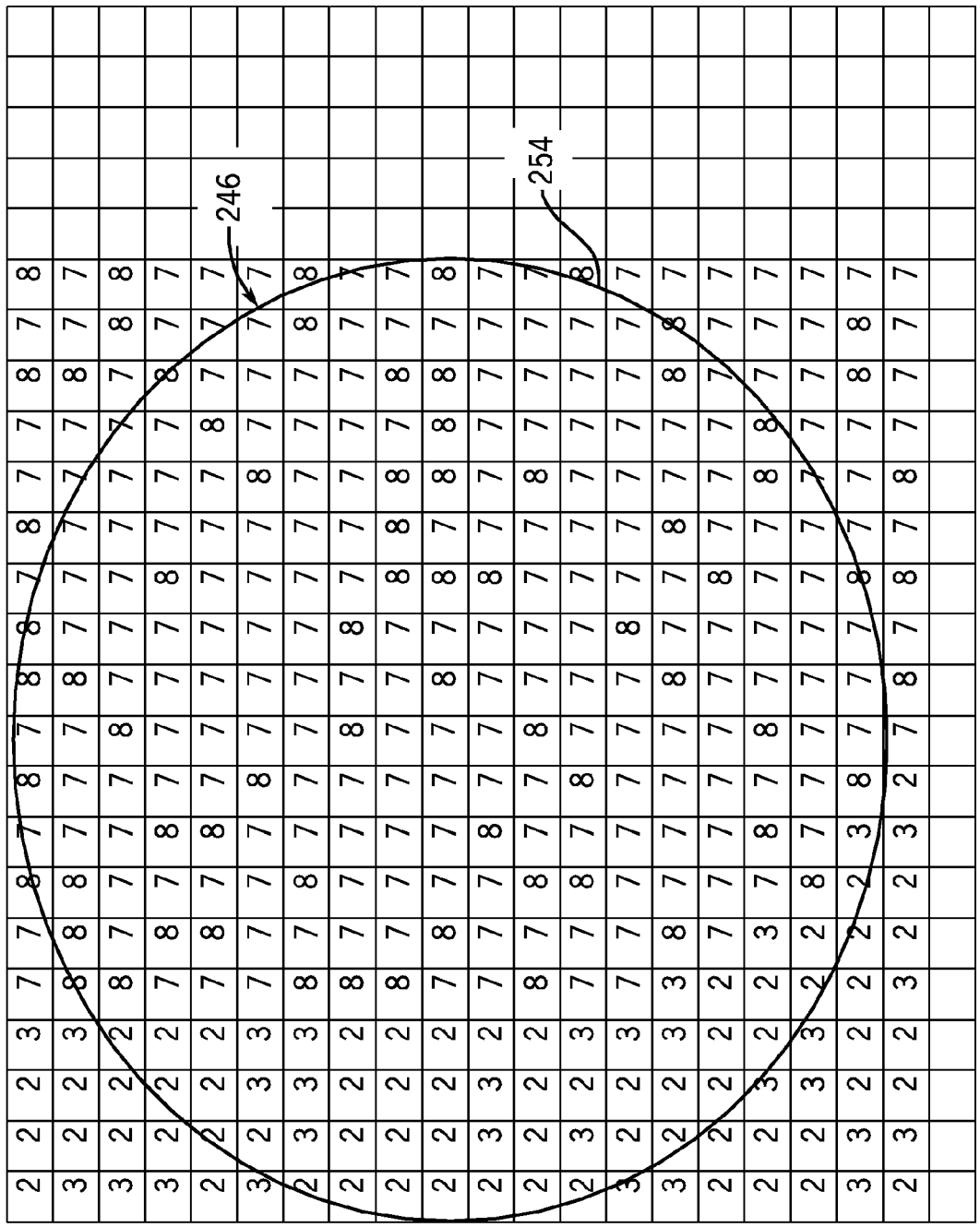
FIG. 9 depicts the attribute values of a region of pixels within the boundary of the modification tool of FIG. 8 in accordance with one embodiment of the present invention.

After identification of the desired value for the pixel attribute of interest, the modification tool 246 may be moved elsewhere in the source image 202 to apply a modification to those pixels over which the tool 246 passes, as depicted in FIG. 8. For example, in the depicted source image 202, the modification tool may be moved within a region including the depicted balloon (denoted by the dotted line 260) to differentially apply an effect, such as brightening, to the balloon but without applying the effect to non-balloon parts of the image. As part of the modification process, a mask may be generated corresponding to all of the pixels of the source image 202 or to those pixels over which the modification tool 246 is passed, such as the region within the dotted line 260. Thus, the mask generation process may involve determining the values for the attribute of interest, such as color, at each respective pixel over which the modification tool is passed. For example, the modification tool 246 may be placed over the edge of the depicted balloon as part of the process of "painting" the balloon with the desired effect. Thus, as depicted in FIG. 9, the attribute values for those pixels within the boundary 254 of the tool 246 are determined, where pixels representing the balloon typically have values of "7" or "8" while pixels representing the sky typically have values of "2" or "3".

Figure 10:
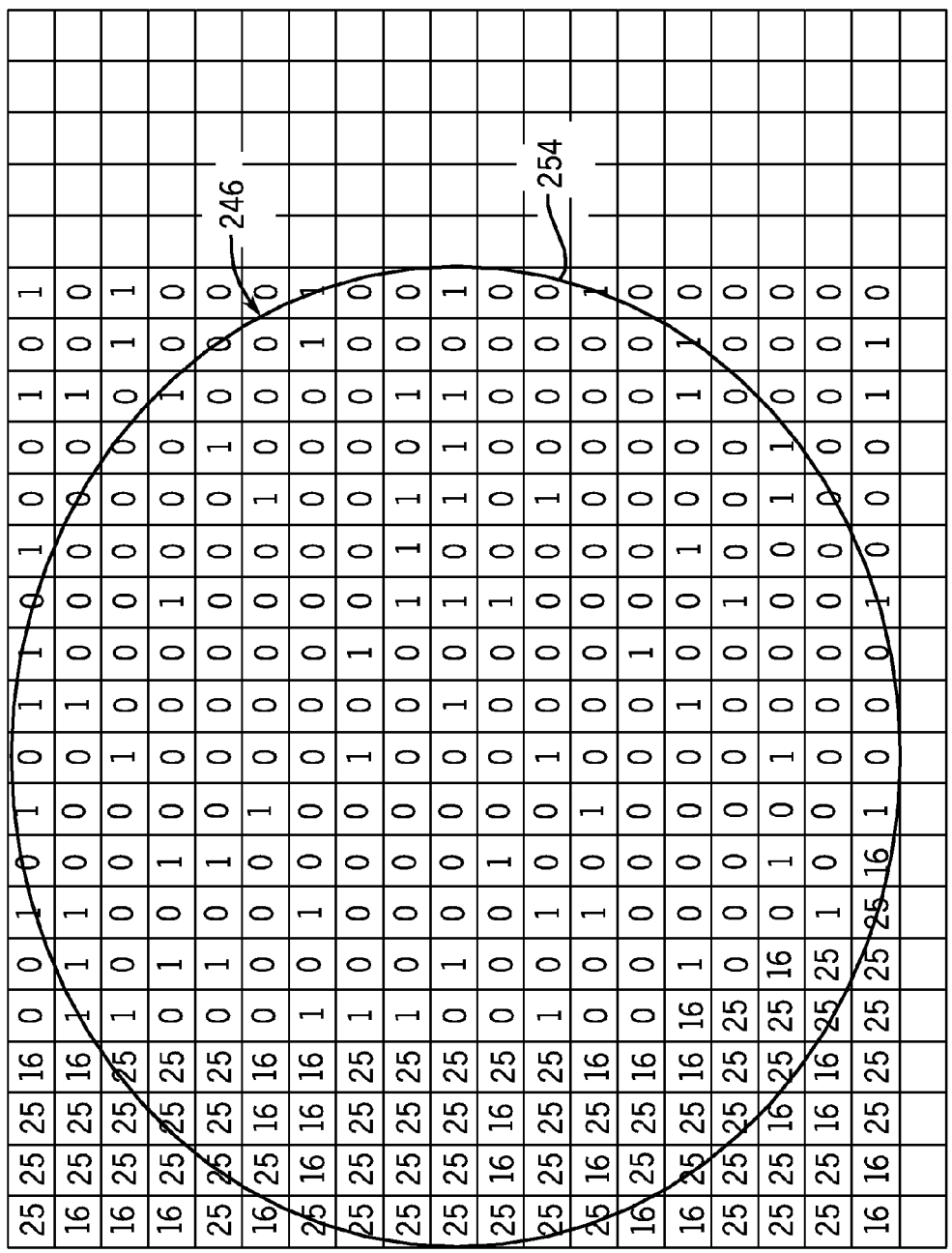
FIG. 10 depicts squared difference values with respect to the desired attribute value for each respective pixel of FIG. 9 in accordance with one embodiment of the present invention.

In one implementation, the difference between the pixel attribute values and the identified attribute value is squared for each pixel of interest. In this example, the pixel attribute value identified by the user (here the value "7" as discussed with regard to FIG. 7) is subtracted from each respective attribute value of each pixel as determined in FIG. 9 and the difference is squared, as depicted in FIG. 10. Thus, those pixels having a value for the attribute of interest which is closest to the user-selected value have the lowest squared difference. That is, those pixels most like the user-selected pixel with respect to the attribute of interest have the lowest squared difference value. Conversely, those pixels that are most dissimilar to the user-selected pixel with respect to the attribute of interest have the highest squared difference value. Thus, in this example, pixels representing the depicted balloon have squared difference values of 1 or less while pixels representing the sky have squared difference values of 16 or greater.

Figure 11:
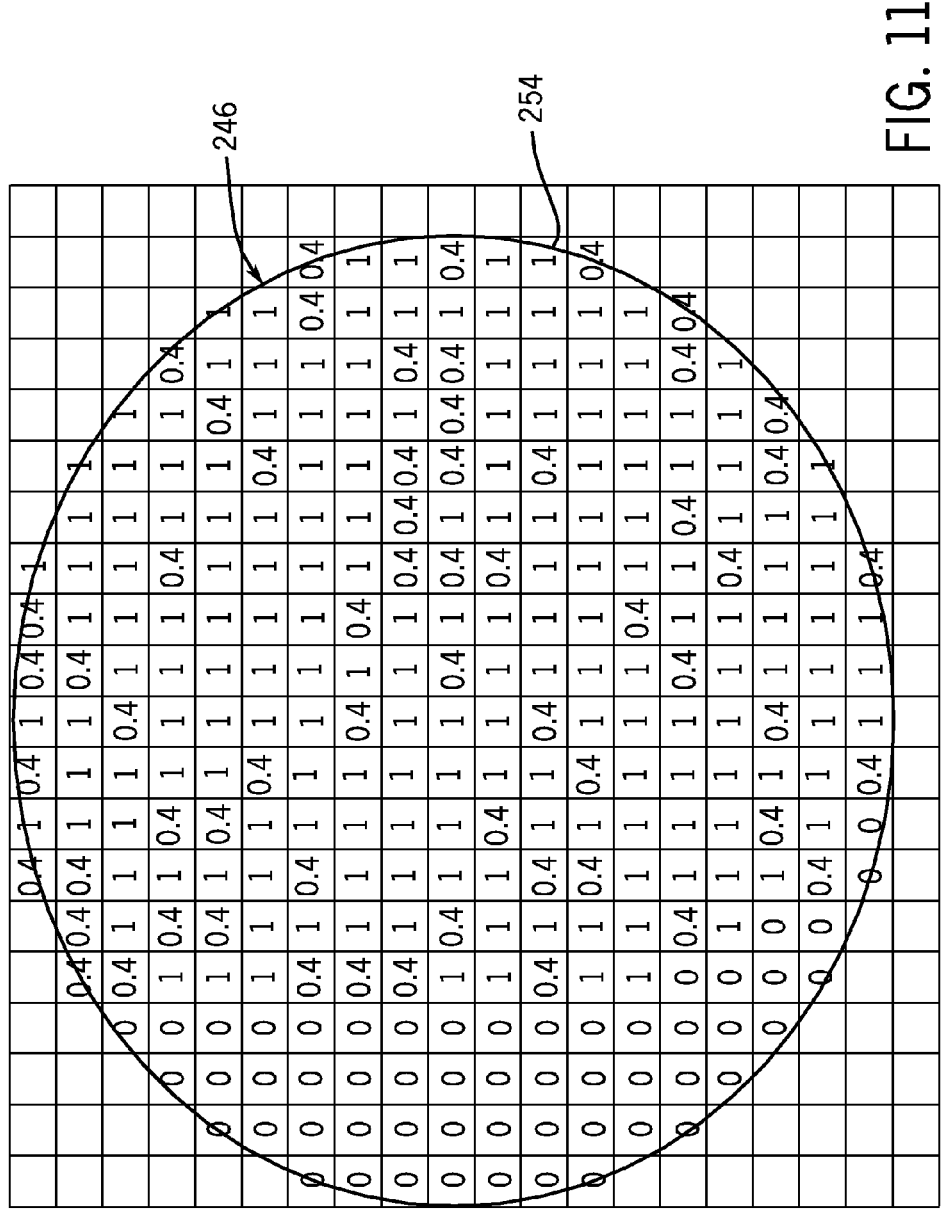
FIG. 11 depicts partial weights based on the squared difference values of FIG. 12 in accordance with one embodiment of the present invention

In certain embodiments, a component of the final weighting factor for each pixel may be based upon the squared difference values of FIG. 10. For example, in one implementation, the function $e^{-d^2}$ may be solved for each pixel of interest where $d^2$ is the squared difference value at each pixel. Thus, for the present example, a component of the final weighting as determined by the equation $e^{-d^2}$ is depicted in FIG. 11. In this example, those pixels representing the depicted balloon have values greater than 0 while those pixels representing the sky have a value of 0.

Figure 12:
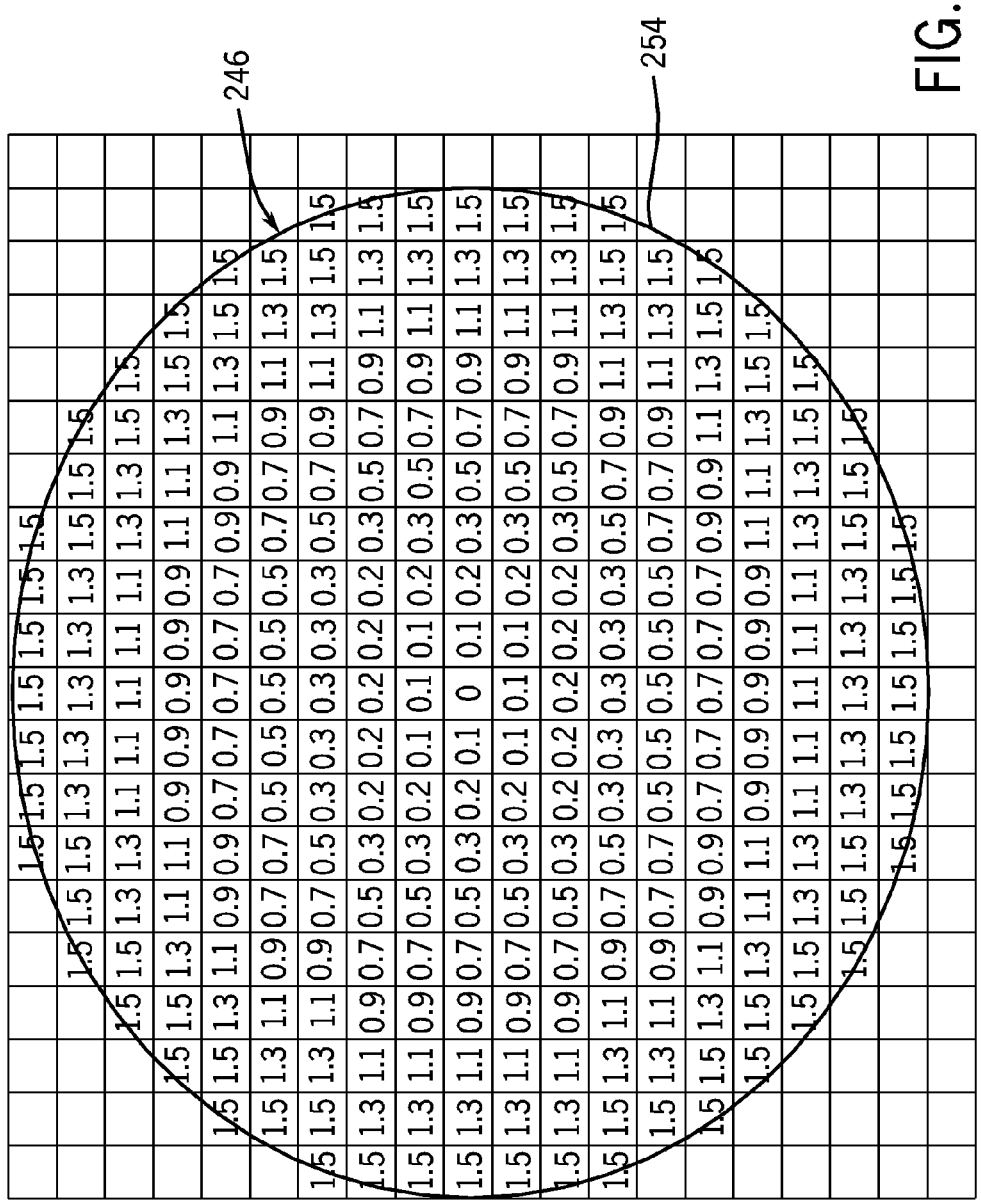
FIG. 12 depicts a radius value for the respective pixels of FIG. 9 in accordance with one embodiment of the present invention.
Figure 13:
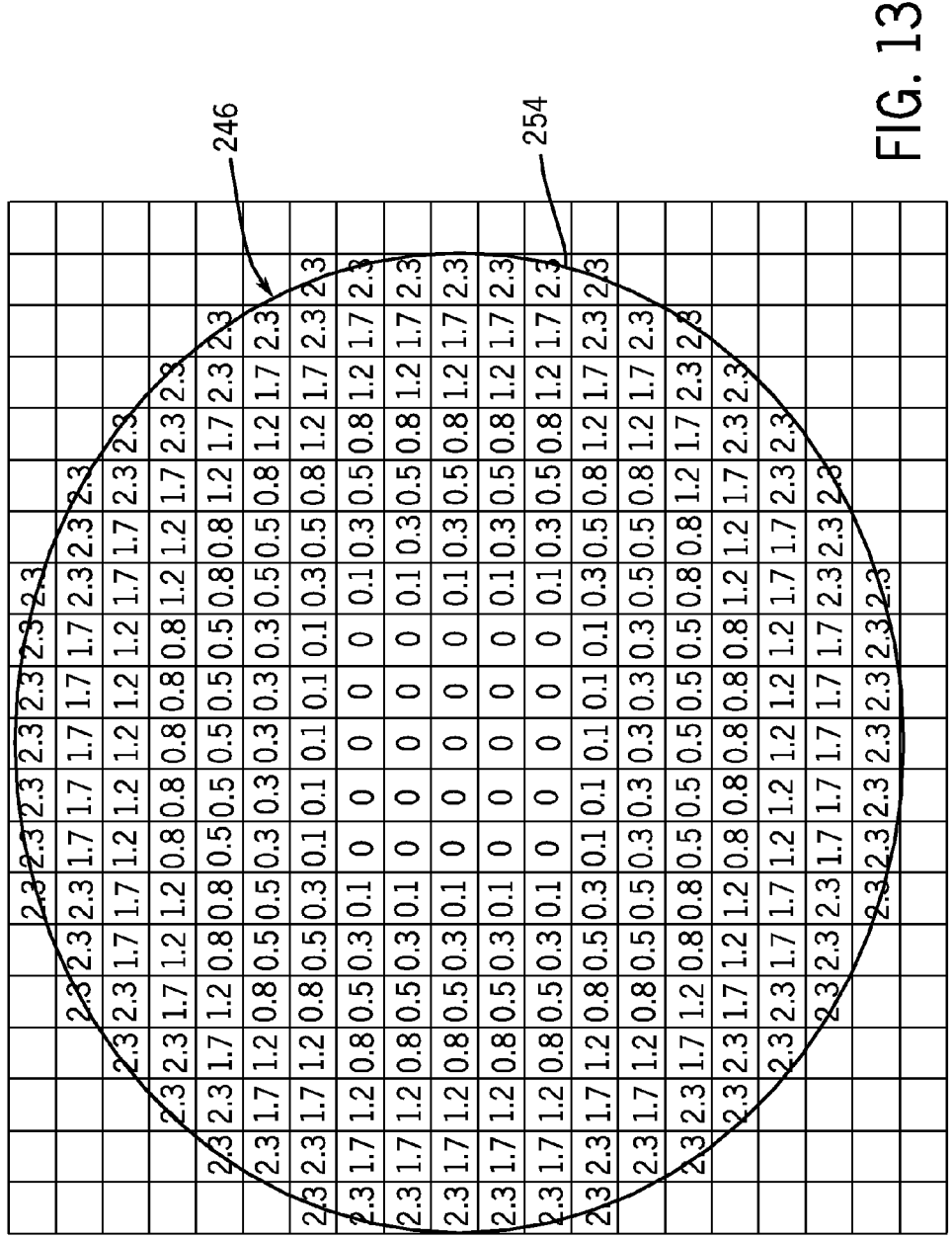
FIG. 13 depicts the squared radius values for the respective pixels of FIG. 12 in accordance with one embodiment of the present invention.
Figure 14:
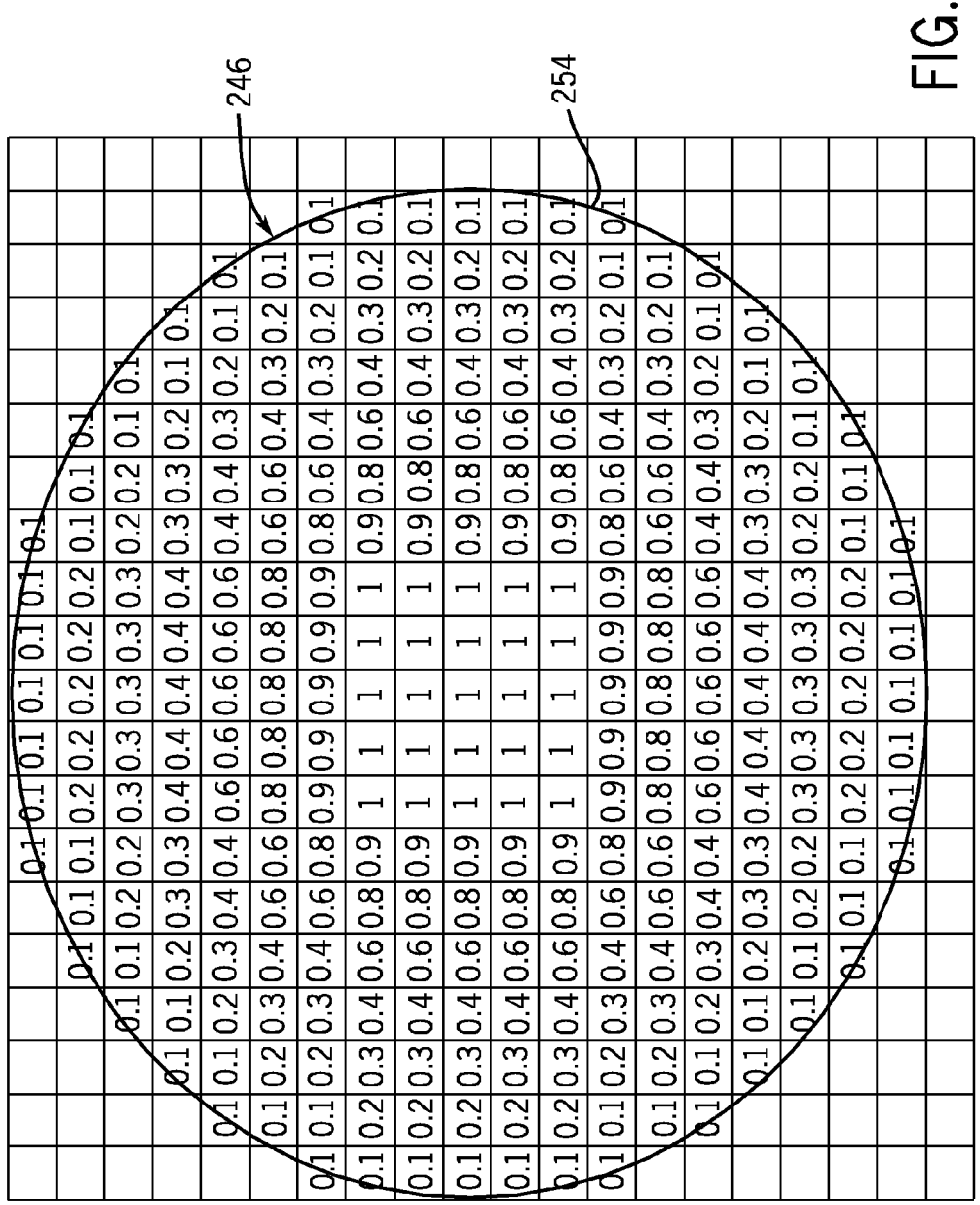
FIG. 14 depicts partial weights based on the squared radius values for the respective pixels of FIG. 11 in accordance with one embodiment of the present invention.

In one embodiment, the difference between some attribute value for the pixels of interest and a user specified value for the attribute contribute to the overall weighting value for each pixel. In a further embodiment, the properties of the modification tool 246 also contribute to the respective weighting values. For example, referring to FIG. 12, the distance of each pixel from the center within the boundary 254 of the modification tool 246 may be determined and used in calculating weighting values. In one implementation, the distances may be squared (as depicted in FIG. 13) and used in a distance based formula to derive a weight component. For example, the squared distance may be used in the equation $e^{-r^2}$, as depicted in FIG. 14, to generate components of the weighting value that are based on the respective pixels distances within the modification tool 246.

In one implementation, the weighting factor is generated using a combination of tool and pixel specific factors. For example, the product of the functions $e^{-r^2}$ and $e^{-d^2}$ at each pixel, as described in the present example in FIGS. 14 and 11 respectively, may be the final weight for each pixel. In other embodiments, the weighting factor may include other or additional factors. For example, more than one pixel attribute (such as color and texture) may be taken into account. In such embodiments, the final weighting factor may be the product or some other combination of the different component factors, such as color, texture, and distance from the center of the tool 246.

Figure 15:
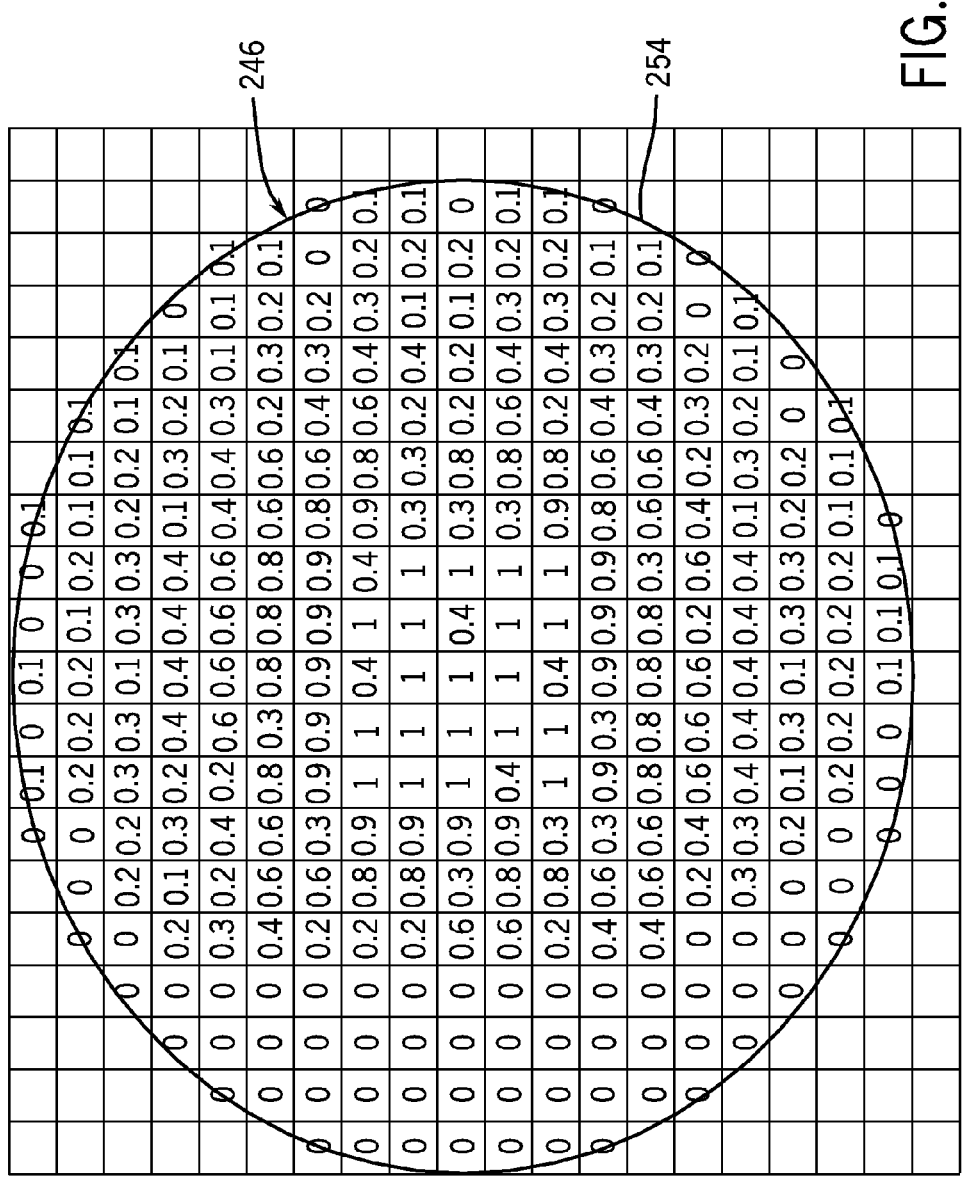
FIG. 15 depicts respective weights for each pixel based on the partial weights of FIGS. 11 and 14 in accordance with one embodiment of the present invention.

Thus, in the present example, the final weight for each respective pixel within the boundary 254 of the modification tool 246 is depicted in FIG. 15 as the product of the weighting components derived based on pixel attributes and pixel location. As depicted, those pixels representing portions of the depicted balloon generally have weightings greater than 0, depending on the similarity of the pixel with respect to the attribute of interest and the distance of the pixel from the center of the modification tool 246. Conversely, those pixels representing sky generally have weightings of 0. Thus based on these weightings, an effect, such as a brightening effect, might be applied to pixels representing the balloon with different degrees of weight but would not be applied to the non-balloon region of the source image 202. In this manner, an effect may be applied to specific regions of a digital image without an edge detection algorithm or process being employed.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method, comprising:
    displaying a brush tool having an area effect;
    selecting a visual characteristic associated with one or more pixels in an image; and
    preferentially applying the area effect to a region of the image corresponding to a location of the brush tool with respect to the image, wherein the area effect is applied to pixels within the region based, at least in part, on a degree to which each pixel exhibits the visual characteristic.

2. The method of claim 1, wherein selecting the visual characteristic comprises selecting at least one of a color characteristic, a grayscale intensity value, or a texture.

3. The method of claim 1, wherein selecting the visual characteristic comprises using the brush tool to select the one or more pixels from the image, from a different image, or from a palette.

4. The method of claim 1, wherein the area effect is modified by a distribution function associated with the brush tool.

5. The method of claim 1, wherein the area effect is further applied based, at least in part, on a threshold associated with the size of the brush tool.

6. The method of claim 1, wherein the area effect is further applied based, at least in part, on a proximity to a center of the brush tool such that the area effect is preferentially applied to those pixels closer to the center.

7. The method of claim 1, wherein the degree to which pixels within the region are determined to exhibit the visual characteristic is based, at least in part, upon a difference or a squared difference between the visual characteristic exhibited by a respective pixel and the selected visual characteristic.

8. One or more non-transitory computer-readable storage media encoding executable routines that, when executed by a processor, cause acts to be performed comprising:
    receiving a selection of a brush tool operable to modify a displayed image, wherein the brush tool has an associated area effect;
    receiving a selection of a visual characteristic associated with one or more pixels; and
    applying the area effect to a region of the displayed image such that the area effect is preferentially applied to pixels within the region that exhibit the visual characteristic within a specified tolerance.

9. The one or more non-transitory computer-readable storage media of claim 8, wherein the selection of the visual characteristic is made using the selected brush tool.

10. The one or more non-transitory computer-readable storage media of claim 8, wherein the visual characteristic comprises a texture defined for a plurality of pixels.

11. The one or more non-transitory computer-readable storage media of claim 8, wherein the visual characteristic comprises a color characteristic or a grayscale intensity value defined for a pixel.

12. The one or more non-transitory computer-readable storage media of claim 8, wherein receiving the selection of the visual characteristic comprises receiving a user indication via manipulation of the brush tool of one or more pixels from the displayed image, from a different image, or from a palette.

13. The one or more non-transitory computer-readable storage media of claim 8, wherein the preferential application of the area effect within the region is based at least in part on radial distance from a center of the brush tool.

14. The one or more non-transitory computer-readable storage media of claim 8, wherein the specified tolerance to the visual characteristic comprises a specified difference or a squared difference between the visual characteristic exhibited by a respective pixel and the selected visual characteristic.

15. An image processing system, comprising:
    display circuitry;
    input circuitry configured to receive inputs from one or more input structures; one or more processors configured to display an image via the display circuitry, to receive inputs from the input circuitry, and to execute one or more stored routines; and
    a memory storing the one or more routines, the one or more stored routine, when executed by the processor, causing acts to be performed comprising:
    displaying a brush tool having an area effect;
    receiving a selection of a visual characteristic associated with one or more pixels; and
    preferentially applying the area effect to a region corresponding to a location of the brush tool with respect to the image, wherein the area effect is applied to pixels within the region based, at least in part, on a degree to which each pixel exhibits the visual characteristic.

16. The image processing system of claim 15, wherein the visual characteristic comprises a texture associated with a group of pixels.

17. The image processing system of claim 15, wherein the visual characteristic comprises a color value or a grayscale intensity value.

18. The image processing system of claim 15, wherein the area effect is preferentially applied based, at least in part, on a threshold associated with a size of the brush tool.

19. The image processing system of claim 15, wherein the area effect is preferentially applied based, at least in part, on a distance between a respective pixel from a center of the brush tool.

\* \* \* \* \*